Oct. 6, 1964   J. E. CLEMENS ETAL   3,151,387
MACHINE FOR MOUNTING TRANSISTORS AND THE LIKE
Filed July 12, 1962   10 Sheets-Sheet 2

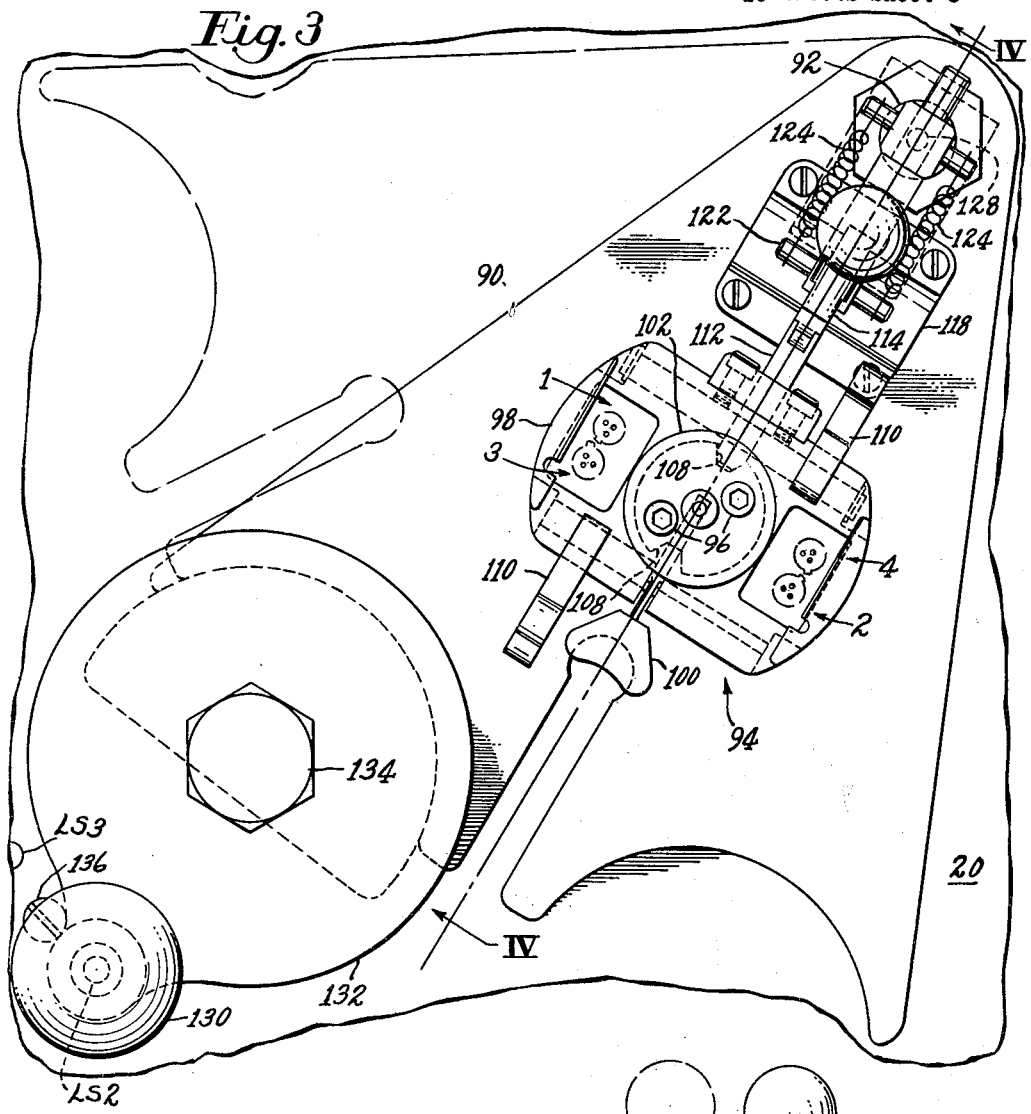
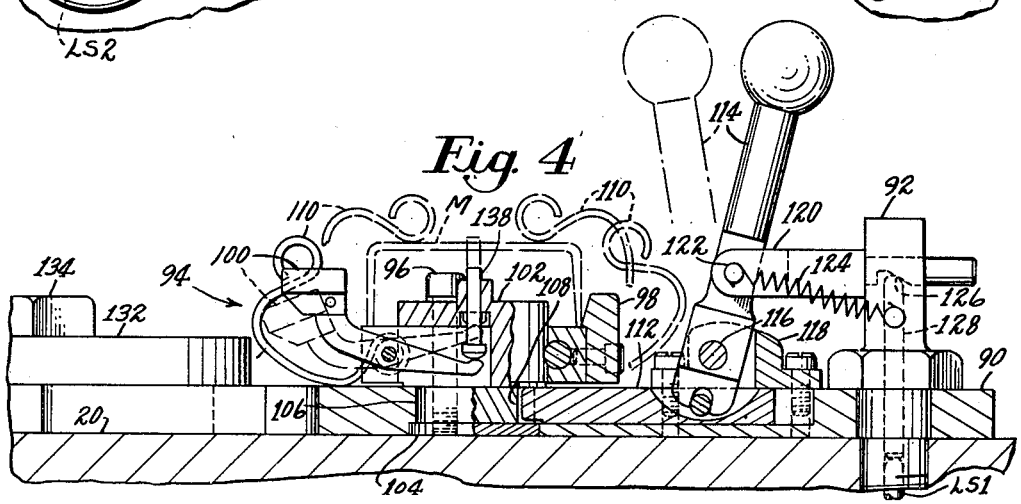

Oct. 6, 1964     J. E. CLEMENS ETAL     3,151,387
MACHINE FOR MOUNTING TRANSISTORS AND THE LIKE
Filed July 12, 1962     10 Sheets-Sheet 4

Oct. 6, 1964 J. E. CLEMENS ETAL 3,151,387
MACHINE FOR MOUNTING TRANSISTORS AND THE LIKE
Filed July 12, 1962 10 Sheets-Sheet 5

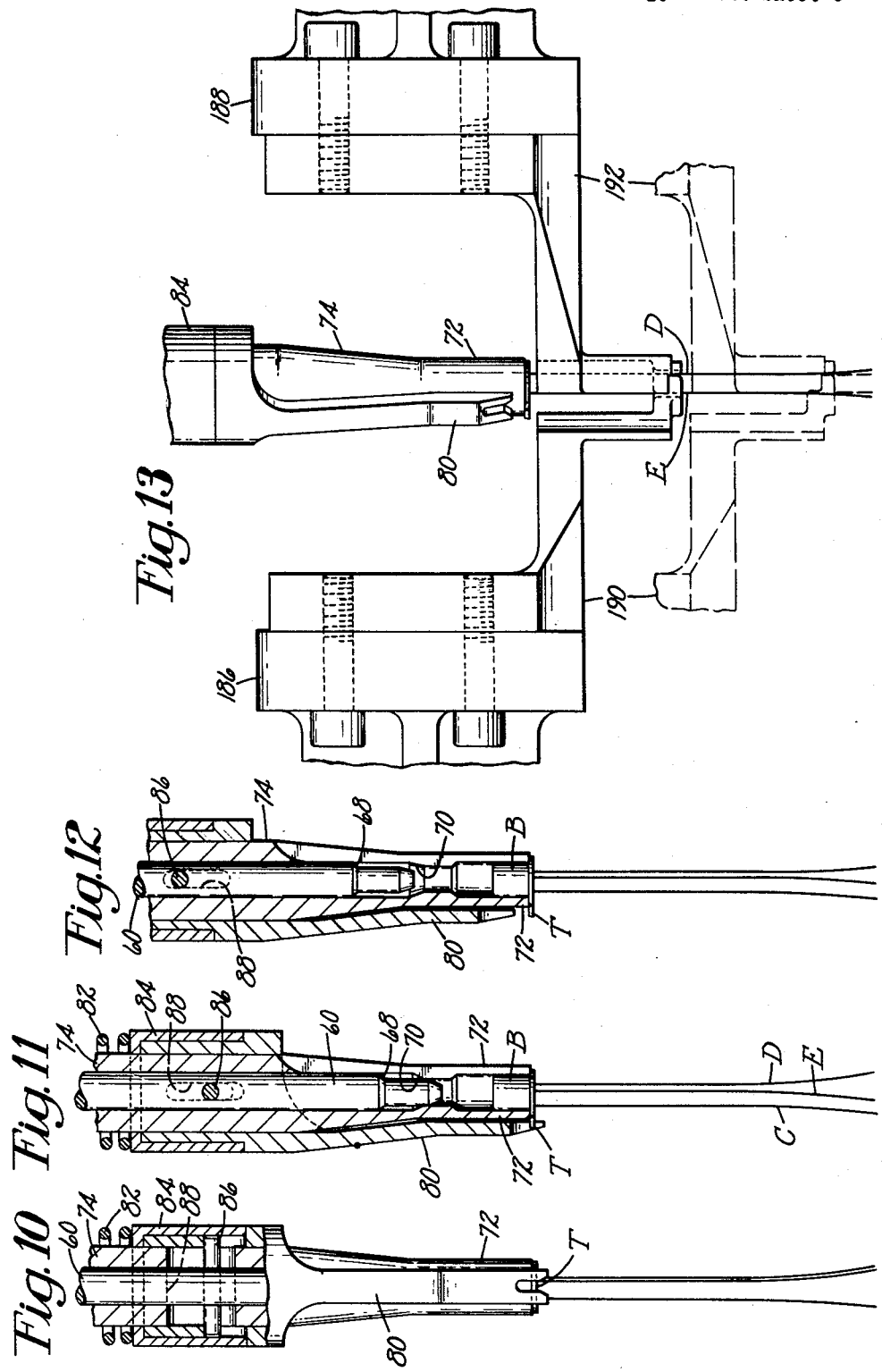

Oct. 6, 1964   J. E. CLEMENS ETAL   3,151,387
MACHINE FOR MOUNTING TRANSISTORS AND THE LIKE
Filed July 12, 1962   10 Sheets-Sheet 8
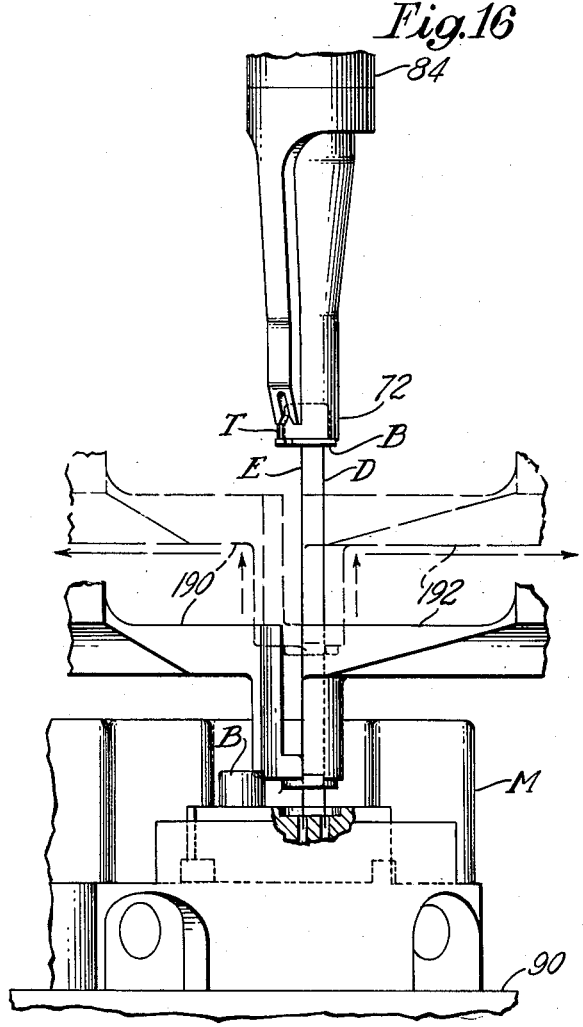
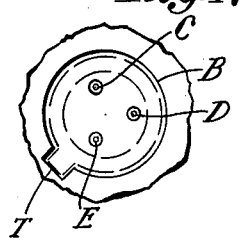
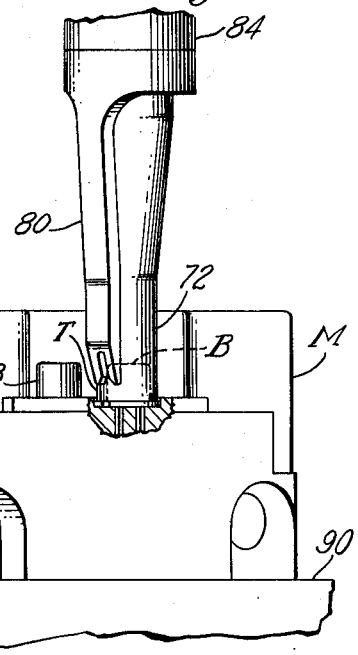
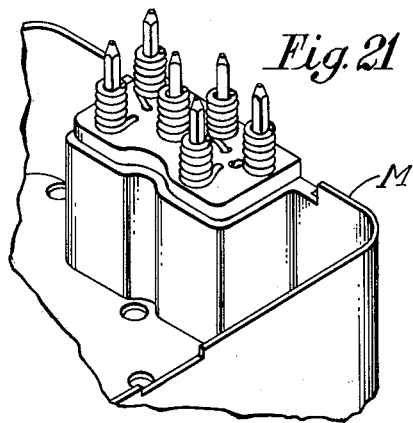
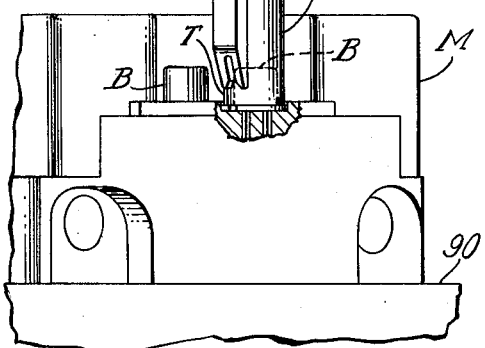

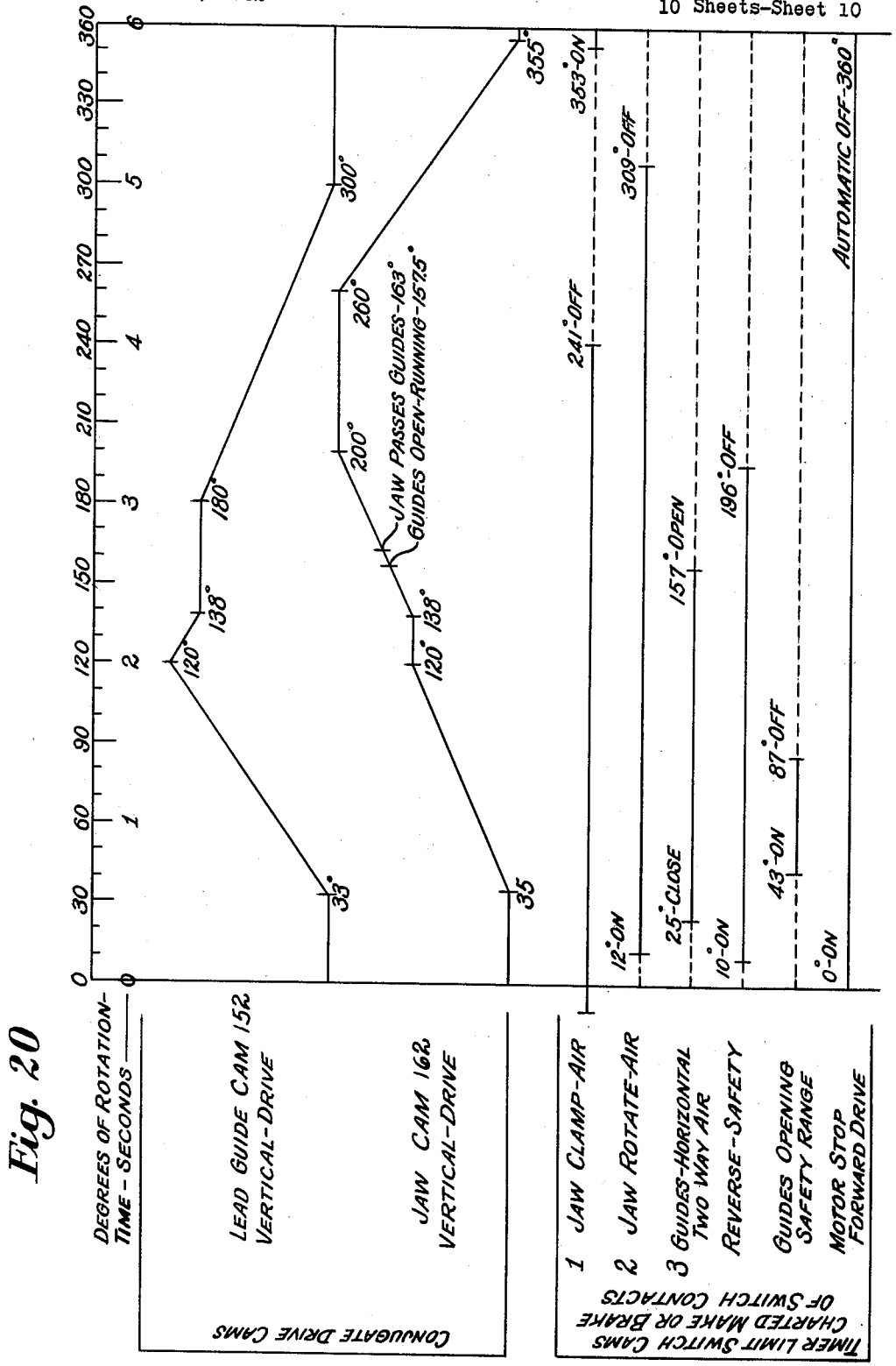

United States Patent Office 3,151,387
Patented Oct. 6, 1964

3,151,387
MACHINE FOR MOUNTING TRANSISTORS AND THE LIKE
John E. Clemens, Xenia, Ben B. Johnstone, Dayton, and James D. Ray, Wilmington, Ohio, assignors to United Shoe Machinery Corporation, Flemington, N.J., a corporation of New Jersey
Filed July 12, 1962, Ser. No. 209,469
7 Claims. (Cl. 29—203)

This invention relates to the provision of a machine for mounting electrical components in a work support, and more especially to the provision of a machine for threading the thin, long and delicate leads of transistors and the like into holes respectively affording only small tolerances.

For efficient use in an automatic assembly system it is found that a component mounting machine must be precise and reliable in operation. This usually means that it must not fail more than once in one-hundred insertions and preferably considerably less. Reliability in threading leads normally decreases with a larger number of leads per component and with longer, thinner leads which are more apt prematurely to become bent, yet frequently it is essential to maintain their length at considerably more than an inch in order to enable their inserted end portions to be suitably connected, for instance by wire-wrapping technique. Moreover, in assembling the more delicate work it is found that extra precaution must be taken in forming or directing leads, particularly when they are coated with gold or other precious metal, lest their junction with the component body be loosened and/or predetermined electrical characteristics be disturbed by frictional engagements such as hitherto have been applied by lead orienting and straightening devices.

In view of the foregoing it is an object of this invention to provide an improved machine for precisely threading the leads of multi-lead components into apertures of a support therefore and with minimal deleterious effect otherwise normally accompanying frictional positioning engagements with such leads. To this end, and in accordance with a feature of this invention, the illustrative machine comprises means for holding a work piece adapted to receive in preforations the respective leads of a component to be mounted thereon, means movable toward and from the holding means and in register with the perforations for releasably gripping the component by its body, lead positioning means including a laterally movable guide or deflector arranged initially to aline the intermediate portion of each lead with its lead receiving perforation while the component body is held by the gripping means, mechanism for thereupon causing the lead positioning means to move relatively to the body gripping means and toward the work piece holding means until the ends of the leads are respectively received in their perforations, and control means for then causing the lead positioning means to be retracted part way along the leads followed by inserting movement of the gripping means, lateral separation of the deflectors, and continued inserting movement of the gripping means.

As illustrated herein the invention is embodied in a machine for successively mounting 3-leaded transistors in a module. The latter is adapted to receive four transistors, and accordingly means is provide for shifting each of its four groups of 3-lead-receiving holes, one group after another, into a position of alinement with an operating head comprising the component body gripping means and lead positioning means referred to above. Since it is imperative to proper completion of electric circuitry associated with the module that each lead of a transistor be received in the correct one of its 3-hole group, the body gripping means is actuatable by means for predeterminedly orienting each component, when manually presented thereto, about its central axis. Thus preliminarily moving a component body angularly also insures that each of its leads, at least in portions not too remote from the body, will generally be positioned in a sufficiently precise manner to be acted upon by a pair of cooperative, laterally movable deflectors adapted accurately to space and register an intermediate portion of each lead with its correct module receiving hole. Then, by reason of equalized deflecting movement of a lead-engaging surface on one deflector and of two coacting, angularly related lead-engaging surfaces on the other deflector, each lead has at least its intermediate portion alined with its mounting hole and its junction with its body so that thereafter relative movement of the deflectors along the leads to prepare their free ends for threading into the module is accompanied by minimal frictional rubbing, and subsequent endwise inserting movement of the leads is likewise effected with minimal friction between them and the deflectors on the one hand and between the leads and the module on the other hand.

The foregoing and other features of the invention, together with novel details of construction and combinations of parts will now be more particularly described in connection with an illustrative machine wherein they are embodied, and with reference to the accompanying drawings thereof in which:

FIG. 3 is a partial plan view of means shown in FIG. 1 for successively shifting a work support into positions to receive a transistor;

FIG. 4 is a section taken on the line IV—IV of FIG. 3;

FIG. 10 is a front elevation, partly in section, of the lower portion of the head or component body control means shown in FIG. 7, but with the parts including the orienting finger turned about the vertical axis to a convenient initial position for reception of a transistor;

FIG. 11 is similar to FIG. 10 but with the part for illustration purposes only, shown turned 90°, component gripping jaws being radially spread to receiving positions by an operating spindle;

FIG. 12 is similar to FIG. 11, but taken at a later stage when the jaw operating spindle is retracted;

FIG. 13 is a front elevation partly corresponding to FIG. 12 and showing successive relative positions of lead positioning means, the orienting finger having angularly moved about 45° from its position in FIGURE 10 angularly to aline upper ends of the leads with their mounting holes, respectively, of a group shown in FIG. 3;

FIG. 16 is a view corresponding to FIG. 13 but at a later stage in a cycle when the deflectors have merely reached the bottom of their strokes and ends of the leads have just been threaded by the inserting head in cooperation with the deflectors; subsequent positions of the latter are indicated by phantom lines;

FIG. 17 is a bottom view of the transistor shown in FIG. 16, as oriented during insertion of its leads;

FIG. 18 is a view corresponding to FIG. 16 showing completion of the inserting stroke;

FIG. 20 is a timing chart relating to drive and control cams of the machine; and FIG. 21 is an angular view of part of an inverted module, the wire-wrapped leads of two transistors inserted by the machine being shown.

Figure 1:
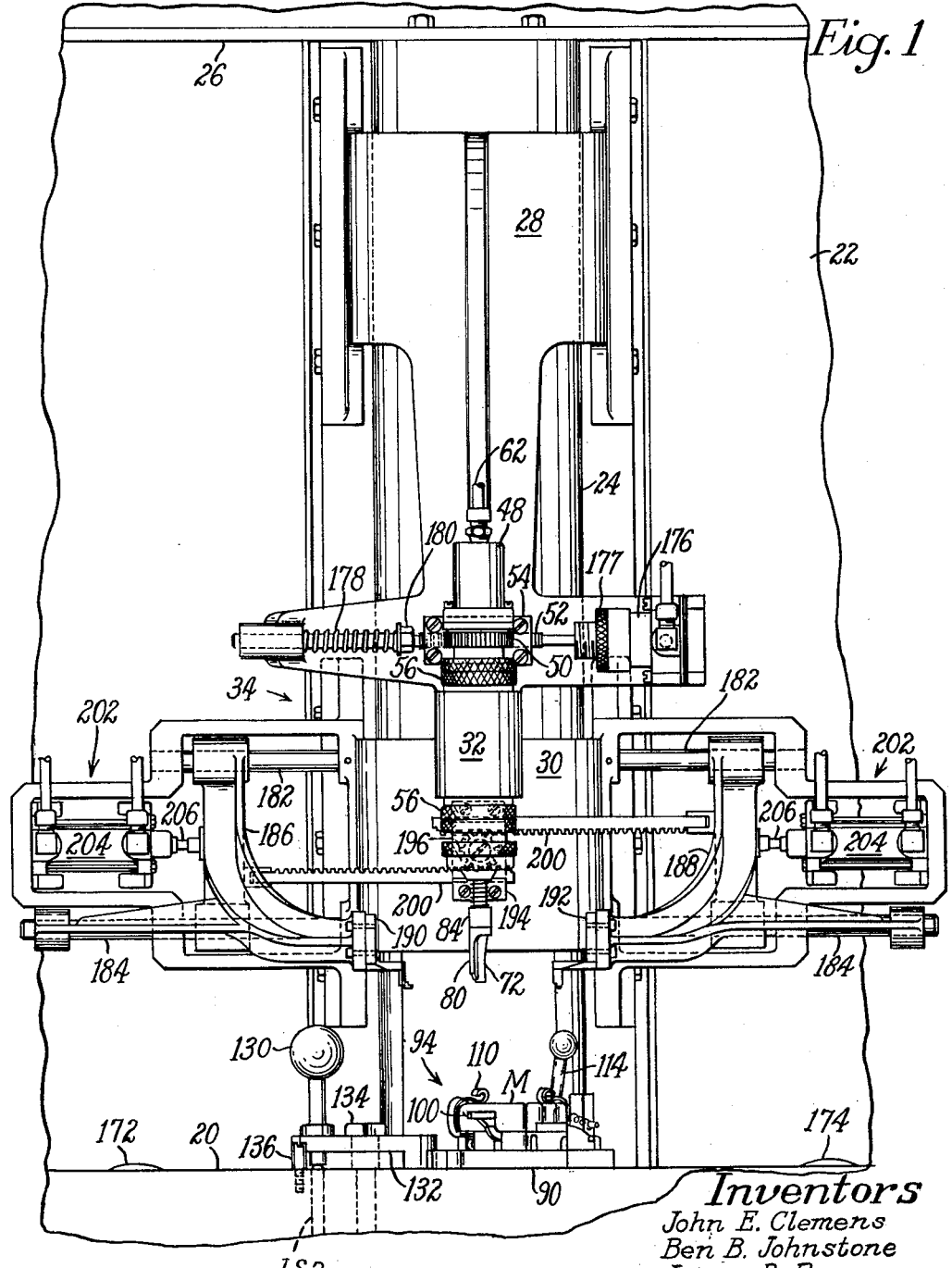
FIG. 1 is a view in front elevation of a machine for mounting multi-leaded components such as transistors.
Figure 2:
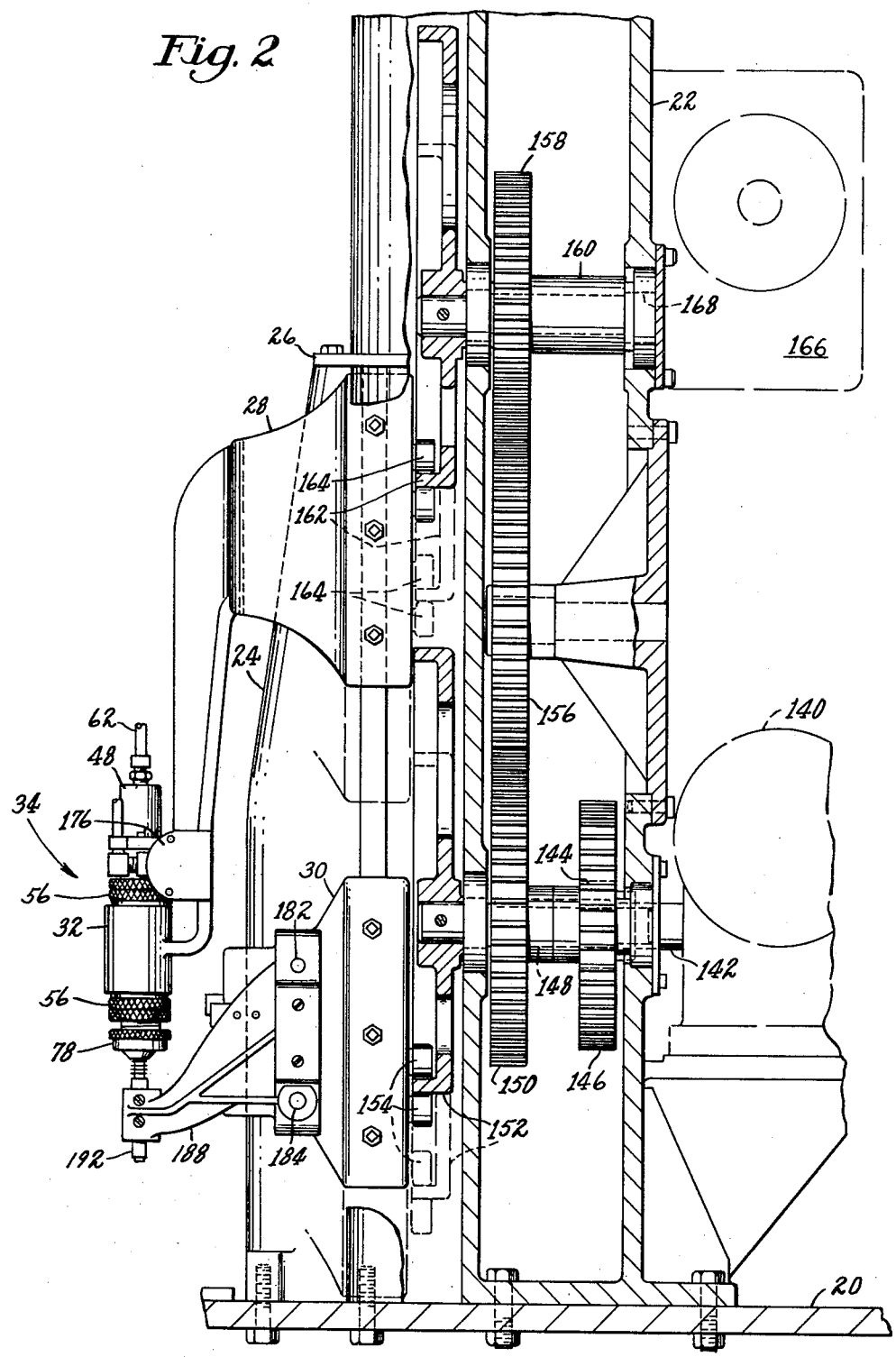
FIG. 2 is a view in side elevation of the machine of FIG. 1 with portions broken away to disclose mechanism for operating its head including component body gripping mechanism and lead positioning means.

Referring to FIGS. 1 and 2, the machine comprises a work supporting table 20 on which is secured an upright, hollow, rectangular frame or gear casing 22 and a vertical guide column 24. The latter is rigidly and centrally spaced from the casing by means of a bracket 26, and has its opposite sides formed to provide vertical ways for accommodating heightwise movements of a head-carrying yoke 28 and a lead-positioning yoke 30.

The yoke 28 is formed in its depending porion with a cylindrical bearing 32 for receiving and rotatably supporting a component inserting head generally designated 34 (FIGS. 1, 2 and 7) next to be described. It comprises a sleeve 36 (FIG. 7) rotatable about a vertical axis on rollers 38 which are maintained in their axially spaced positions by pressured fit bearing retainers 40, 42. Axially disposed in the sleeve is a piston rod 44 the upper end of which is provided with a piston 46 reciprocable in a cylinder 48. This cylinder is bolted to the upper portion of a pinion 50 arranged to mesh with a horizontally reciprocable rack 52 slidable, by component orienting means later explained, in a slotted portion of the yoke 28 and a guide block 54 secured thereto. For adjustably securing the sleeve 36 heightwise relative to the head-carrying yoke 28, nuts 56, 56 are threaded onto the sleeve and, similarly, locking nuts 58, 58 respectively abut the nuts 56 to maintain their selected positions. Axially secured to the lower end of the piston rod 44 is a jaw-operating spindle 60 (FIGS. 7, 10–12). This spindle, in the absence of fluid pressure being applied to the top of the piston 46 via a tube 62 by means later described, is urged upwardly by a spring 64 confined on the rod 44 between its piston and a collar 66 (FIG. 7) bearing on the sleeve 36, a beveled end 68 (FIGS. 7, 11) of the spindle thus normally being retracted from engagement with a cam surface 70 formed internally of split collet jaws 72, 72 to permit their closure and movement into gripping relation with the body B of a transistor.

Figure 7:
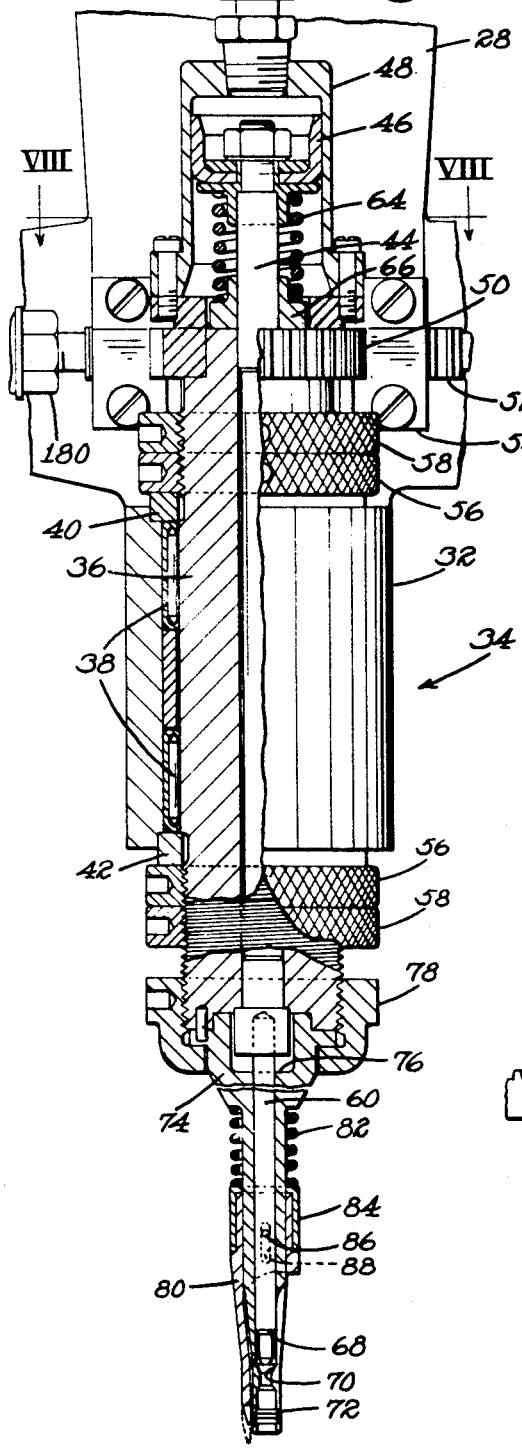
FIG. 7 is an enlarged front elevation of the operating head shown in its starting position as in FIG. 1, except that an orienting finger is angularly displaced for clarification only, portions being broken away to reveal construction details.

As shown in FIG. 7 the jaws 72 depend from, and are integral with, a nosepiece 74 pinned to the sleeve 36 for rotation therewith. The piece is axially bored to receive the spindle 60 and has a stop shoulder 76 formed to limit its relative downward movement. A nut 78 threaded on the lower end of the sleeve 36 retains the nosepiece against relative axial displacement. In order to insure uniform angular orientation of successive transistor bodies B and their leads C, D and E (FIGS. 10–17 and 21), respectively, a detachable, partly bifurcated finger 80 is slidably mounted coaxially on the nosepiece. For this purpose the finger, when permitted (during jaw opening movement of the spindle 60) to be lowered by a compression spring 82 on the nosepiece, is adapted to straddle a tab T of the transistor body. The spring 82, being weaker than the spring 64, is normally held compressed between an external shoulder of the nosepiece and a hardened cap 84 receiving a cylindrical upper end portion of the finger. A pin 86 (FIGS. 7, 10–12) extending transversely through an axial slot 88 formed in the spindle 60 has ends retained by the cap 84 in bores of the finger, and accordingly serves to maintain the latter and the jaws 72 in fixed angular relation. Having presented the component in a convenient loading position indicated in FIG. 10, with the tab T to the front of the machine, upward relative retraction of the spindle 60 to permit gripping of the component body by the jaws 72 is accompanied by relative upward movement of the pin 86 and hence of the finger 80 to lift it from a position wherein it otherwise might subsequently interfere with full seating of the component.

Figure 5:
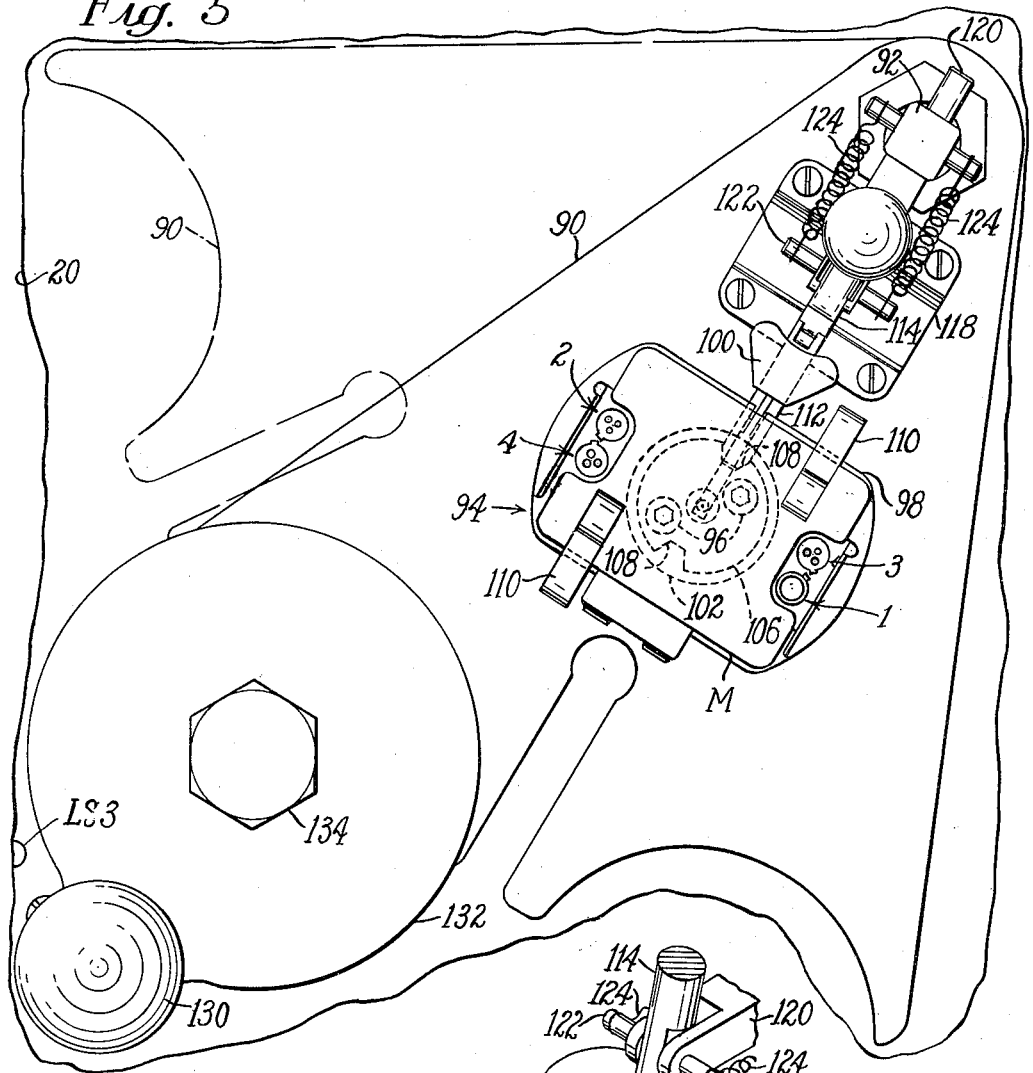
FIG. 5 is a plan view similar to FIG. 3 but showing a module moved into position to receive its second component.
Figure 6:
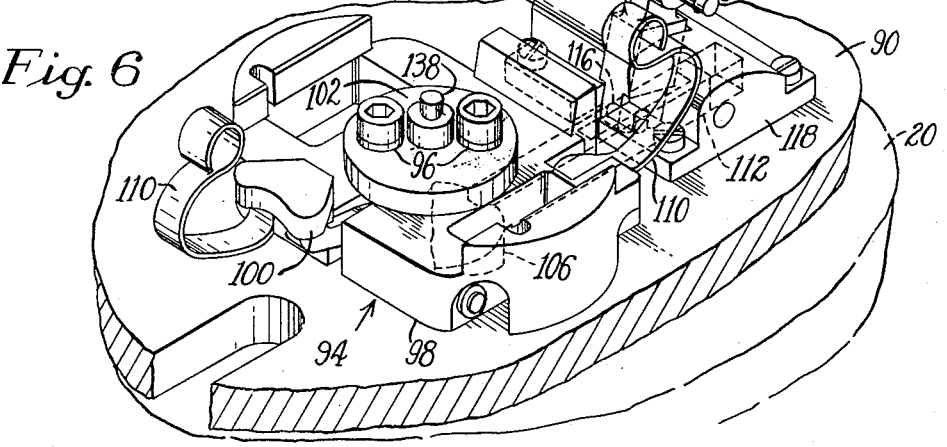
FIG. 6 is a perspective view of the module supporting elements shown in FIGS. 3–5.
Figure 19:
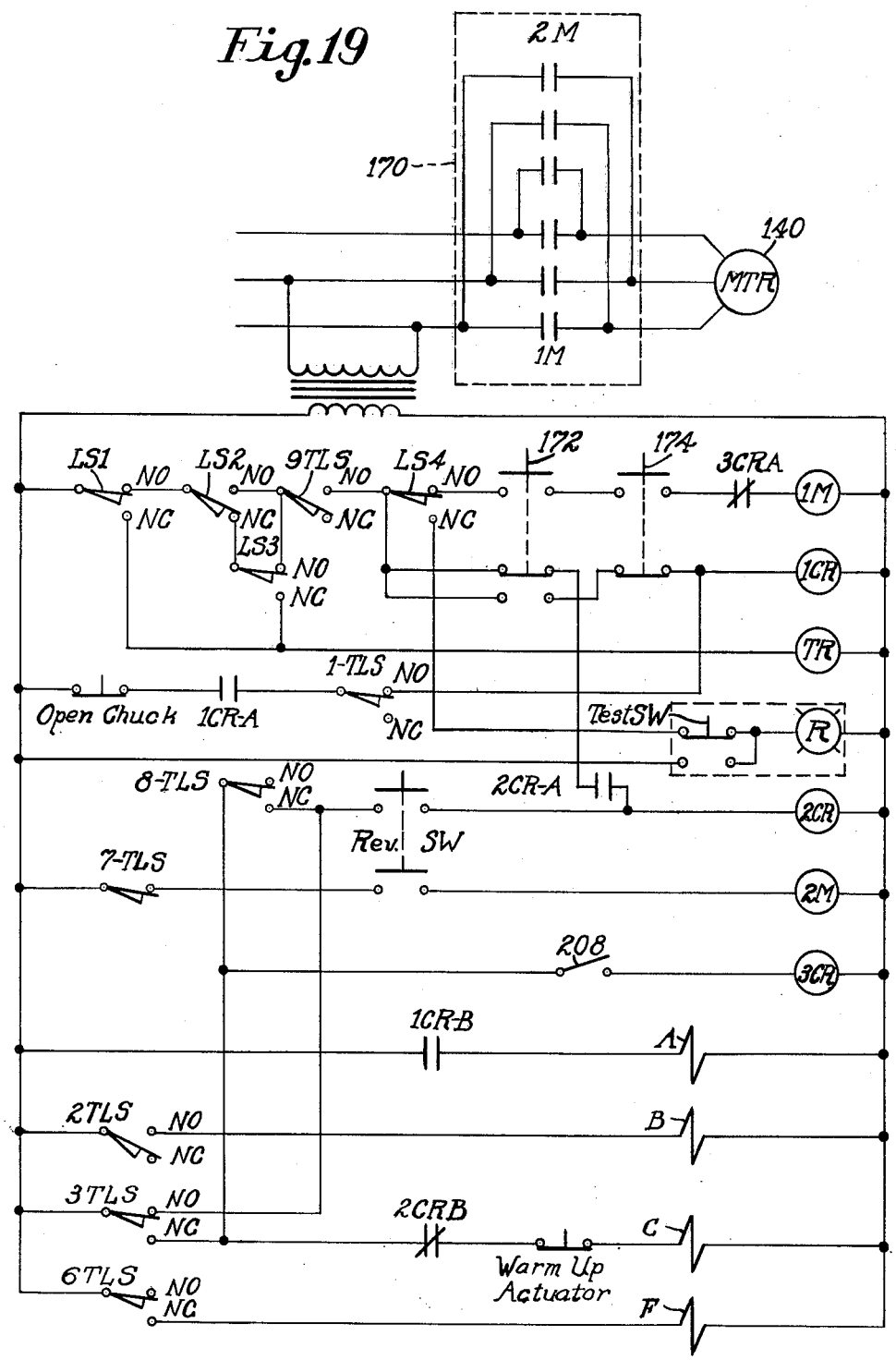
FIG. 19 is an electrical diagram, of the machine, the switches being shown in their positions at the start of a machine cycle.

In the illustrative machine, a mounting in the form of a module M (FIGS. 4 and 5) formed with four groups of lead-receiving holes is shifted successively to bring each group into precise register with the vertical operating path of the inserting head 34. To this end a turret or carriage 90 (FIGS. 3–6) pivotally secured on the table 20 by means of an axially bored stud 92 is manually shiftable angularly by a Geneva mechanism. The module M is first placed on a pallet generally designated 94 adapted to receive it as shown in FIG. 4, the pallet being secured in assembled relation by a pair of screws 96, 96 and mounted in the carriage for rotation about a vertical axis. As shown in FIGS. 4 and 6 the pallet comprises a main body 98 having internal positioning faces and pivotally carrying a control lever 100, upper and lower clamping blocks 102, 104 through which the screws 96 extend, and a cylindrical lock portion 106 between the blocks which, for a purpose to be explained, is formed with oppositely disposed V-shaped slots 108. For holding the module in selected component reeciving position a pair of wire spring clamps 110, 110 have their lower ends pivoted to the body 98 and are swung into retaining positions as indicated in FIG. 4. The initial component receiving position or socket is indicated by the numeral 1 in FIG. 3. After the first transistor has been inserted in that position, the pallet may be turned 180° upon its clamping block 104 and thus shift the receiving position or socket designated 2 into the location formerly occupied by the number 1 receiving position. In order to do this, a locking and centering bar 112, normally engaging the angular walls of one of the slots 108 to hold the module against relative rotation, is temporarily retracted from locking engagement with the pallet portion 106 by means of a shifting lever 114. The latter is pivotally supported on a pin 116 in a block 118 secured on the carriage 90 and has a pin and slot connection with the bar 112. For normally urging this bar into locking position, an arm 120 having one end slidable horizontally in the stud 92, has its other end connected by a cross pin 122 to the lever 114, tension springs 124, 124 anchored to the stud being connected to the pin 122. Incidentally, an electric interlock is provided such that when the bar 112 is retracted from its locking position, a cam 126 formed on the arm 120 depresses a pin 128 (FIG. 4) within the stud 92 sufficiently to shift a later-mentioned control switch LS1 (FIGS. 4 and 19) to its normally closed position. The module M and cooperating work registering parts now occupy the relative positions indicated in FIG. 5. After operation of the inserting head 34 to install the second transistor, to aline component socket or position 3 with the head, the operator merely rotates (counterclockwise as viewed in FIG. 5) a Geneva indexing crank 130 of an actuator 132 pivoted to the table 20 at 134. The crank is thus moved from a position over an interlock switch LS2 (FIGS. 1, 3 and 19), where the crank abutted an index stop pin 136 in the table, until the crank again abuts the stop pin and actuates a safety interlock switch LS3 (FIG. 3). This moves the carriage 90 in a clockwise direction (FIGS. 3 and 5) to the phantom position carrying position 3 into alinement with the head. Lastly, for alining component receiving position 4 with the head 34, the operator unlocks the pallet 94 and swings it 180° before again locating the pallet. Removal of the completed module from the pallet is effected by depressing the exposed end of the lever 100 (FIG. 4) the other end of which is arranged to lift a pin 138 engageable with the module. Return of the carriage to its starting position is effected by means of the actuator 132.

Mechanism for operating heightwise the lead-positioning yoke 30 and the head-carrying yoke 28, respectively, will next be described. A motor 140 (FIGS. 2 and 19) mounted at the rear of the machine drives, through a reduction gear shaft 142 (FIG. 2), a pinion 144 meshing with a gear 146. The latter is keyed on a cam operating shaft 148 which is journaled in the casing 22 and mounts a gear 150 and a conjugate cam 152. As indicated in FIG. 2 this cam cooperates with a pair of rollers 154, 154 carried by the yoke 30. The gear 150 is arranged to mesh with an idler gear 156 which is thus disposed to mesh with a gear 158 on a cam shaft 160 having bearings in the casing 22. A conjugate cam 162 secured on an end of the shaft 160 is accordingly rotatably driven and cooperates with a pair of follower rolls 164, 164 carried by the yoke 28, the range of heightwise movements of the two sets of follower rolls being shown by phantom lines in FIG. 2.

Bracketed to the rear of the casing 22 is a timer control unit of conventional construction generally designated 166 (FIG. 2). It comprises a timer relay coil TR (FIG. 19) controlling a plurality of coaxial timer limit switch cams (not shown) and their respective switches respectively adapted to actuate operating valves by means of fluid pressure controlling solenoids A, B and C later referred to and indicated in FIG. 19, the cyclical timing of switch action being shown in FIG. 20. The bank of timer cams adjustably and precisely controls the sequence and duration of each machine function relative to those effected by the cams 152, 162, the timer drive being via an output shaft 168 (FIG. 2) coupled to the shaft 160. As herein shown air under pressure is supplied from a suitable source and applied as will now be described in conjunction with electrical controls operative in a cycle. A double-throw 3-pole switch 170 (FIG. 19) is closed to provide energy for driving the motor 140 forwardly normally, or reversely when required. Assuming that the module M has been secured in position to receive its first component, a transistor is held lightly in the right hand by its leads adjacent to its body B as the latter is inserted upwardly into the jaws 72 with the tab T located between the tines of the finger 80. Then a jaw closing switch 172 (FIGS. 1 and 19) is held depressed with the left hand, and a main motor starting switch 174 is held depressed with the right hand to initiate a cycle. Depressing the switch 172 energizes a relay 1CR, a motor stopping-timer limit switch 9TLS automatically being closed as later explained; consequently a normally open contact 1CR–B is closed to energize the solenoid A and thus relieve air pressure to the piston 46 and permit closing of the component gripping jaws 72. They remain closed on the body B until a switch 1TLS (FIG. 19) in the timer bank of cams automatically opens the jaws.

It should be observed that, as a safety measure, before starting a cycle either the pallet 94 must first be rotated to enable the switch LS1 to energize the coil TR or the Geneva crank 130 turned momentarily to cause the switches LS2 and LS3 to shift to normally closed positions for energizing the coil TR before the jaws 72 can be closed and the motor started, the energizing of the coil TR by either means positioning the timer limit switch 9TLS (FIG. 19) to close its normally open contacts and permit energization of the relay 1CR. These contacts remain closed until the timer 166 has assumed its proper zero or starting position. It should also be noted that after the coil TR has been energized and the switch 9TLS thus shifted to close its normally open contacts, either of the switches LS2 or LS3 must return to normally open position before the jaws 72 will operate or the motor 140 will run. Hence operation of the machine is prevented if a module is improperly indexed and if an inadvertent attempt is made to insert two components into the same socket or receiving position.

Figure 8:
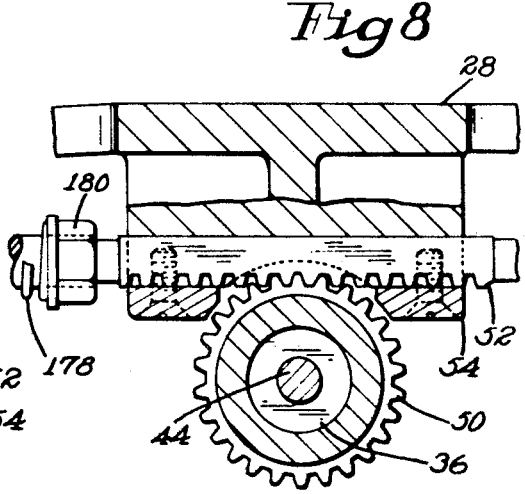
FIG. 8 is a section taken on the line VIII—VIII of FIG. 7 and indicating the means for orienting a component about a vertical axis.

Early in the machine cycle (about 12° as shown in FIG. 20), angularly to aline the loaded component with the socket intended to receive it, one of the timer cams closes a timer limit switch 2TLS (FIG. 19) to energize a solenoid B and thus slides the rack 52 to the left by opening a valve admitting air under pressure to one side of a piston (not shown) in a cylinder 176 (FIG. 1) secured to the yoke 28. For this purpose, as shown in FIGS. 1, 7 and 8, a right-hand extension of the rack 52 serves as a piston rod in the cylinder 176 and the latter threadedly carries a stop collar 177 (FIG. 1) engageable with the piston predeterminedly to fix angular orientation of the component during insertion. A left-hand extension of the rack 52 is reciprocally supported in a bore formed in the yoke 28 and carries a compression spring 178 confined between the yoke and a nut 180. This spring accordingly subsequently urges return of the jaws 72 to their reloading position shown in FIG. 10 upon reopening of the switch 2TLS toward the end of a cycle.

Figure 9:
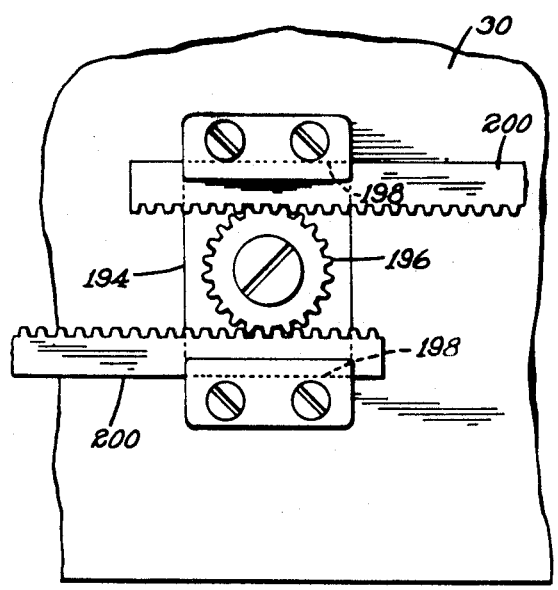
FIG. 9 is a detail in front elevation of racks shown in FIG. 1 for equalizing lateral movement of lead deflectors.
Figure 15:
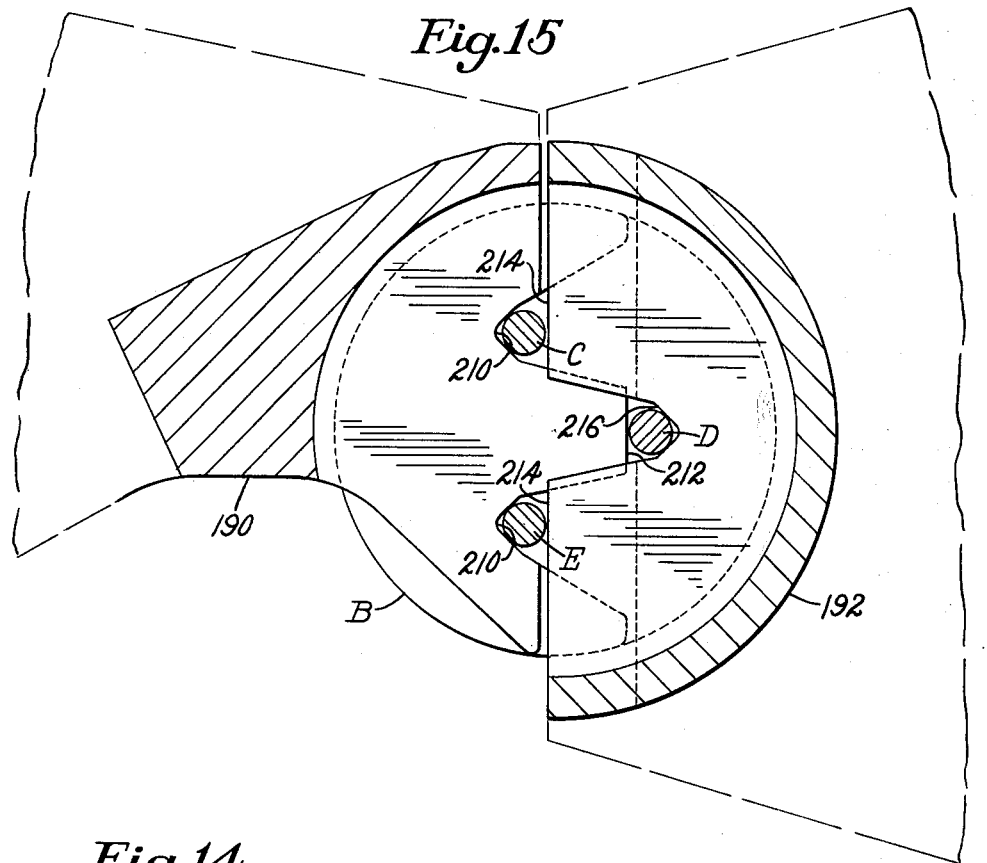
FIG. 15 is a section taken on the line XV—XV of FIG. 14 showing the several lead positioning surfaces.
Figure 14:
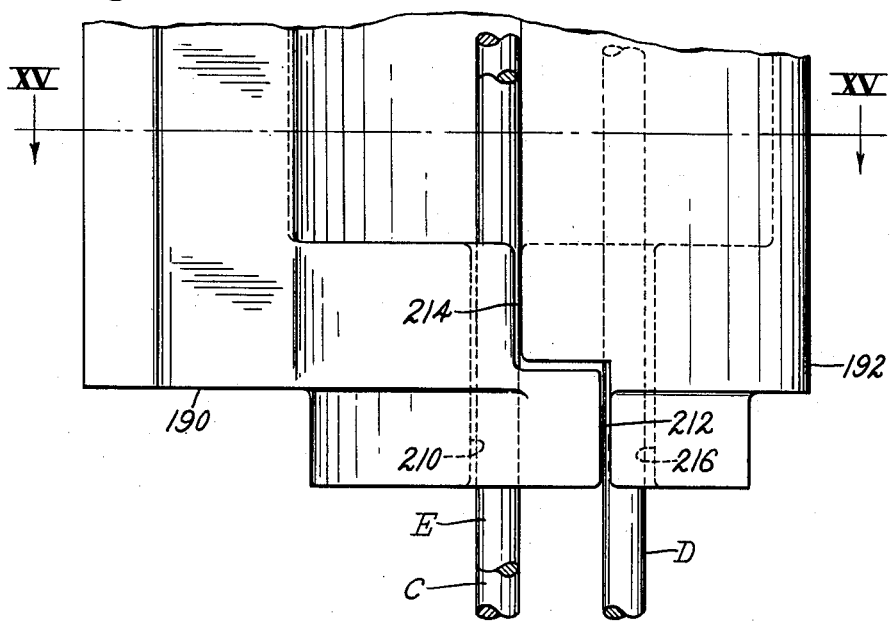
FIG. 14 is an enlarged view of the lead deflectors shown in FIG. 13.

The head 34 having been angularly oriented to aline its transistor body with a socket or group of lead receiving holes, in this case as shown in FIG. 13, laterally acting lead positioning means next to be described and mounted in the yoke 30, is actuated for registering the leads, or at this stage at least their intermediate portions, with the lead receiving holes respectively. For this purpose the yoke 30 is formed to support two pairs of horizontal guide bars 182, 184 (FIGS. 1 and 2), the left-hand pair being arranged slidably to carry an arm 186 similar to an arm 188 slidably receiving the right-hand pair. Detachably secured to the lower ends of the arms 186, 188 respectively are cooperative lead guides or deflectors 190, 192 (FIGS. 13–16) which are brought, at about 25°, into lead engaging positions as indicated in FIG. 13 by equalizer mechanism now to be described. Referring to FIGS. 1 and 9, a block 194 secured to the yoke 30 provides a bearing for a pinion 196 and ways 198, 198 for receiving racks 200, 200, secured at their outboard ends respectively to the arms 186, 188 and meshing with the pinion. The latter arms are each shifted laterally with the guides 190, 192 by means of an air operated device 202 (FIG. 1). It consists of a double acting piston (not shown) in a cylinder 204 affixed to the yoke 30, and a piston rod 206 connected to the adjacent arm 186 or 188. A solenoid C (FIG. 19) energizable by a coil 3CR upon closure of a "warm-up" switch 208 and operation of a timer limit switch 3TLS (FIG. 19) at about 25°, as shown in FIG. 20, serves to admit air to the cylinders 204 and thus simultaneously urges the guides 190, 192 to closed, lead alining positions shown in FIGS. 13–15. Parenthetically, it may be noted that inclusion of the "warm-up" switch is optional and is merely provided as a desirable safety measure to enable an operator, should break-away friction be high in the air-operated mechanism after a period of machine idleness, to free movable parts preliminarily to their regular operation in a cycle. One of the guides is formed with a pair of V-shaped lead receiving grooves 210 (FIGS. 14, 15) and an intermediate flat 212, and the other is formed with a pair of flats 214 and an intermediate V groove 216 thus slidably and predeterminedly confining and precisely centering adjacent portions of each of the leads with a flat and two angularly disposed deflecting surfaces.

Referring to FIG. 20 the preferred sequence in the remainder of the cycle as regards the inserting head 34 and relative lead controlling movements of the guides 190, 192 is as next described. At about 33° the guides commence descent along the enclosed or captured leads at a constant rate. At about 35° the component carrying jaws commence descent at a slower, constant rate, the guides moving away from the jaws 72 and to within about 1/16" of the free but captured lead ends as the latter enter their module holes. At 120° of the illustrative cycle downward motion of the jaws and guides stops with the leads threaded, and while the jaws are stationary the guides than ascend away from the module and slip along the threaded leads to a supporting position midway between the module and the then position of the jaws. At 138° the guides have come to rest at midpoint of the exposed lead lengths. The jaws next resume downward inserting movement, the guides laterally separating at 157° to allow further descent of the jaws. At 180° the guides again ascend, arriving at their starting positions at about 300°. Meanwhile, the head 34 has bottomed at 200° with the leads fully inserted and available for operation of clinching or wire wrapping mechanism (not shown). At about 241° a timer limit switch 1TLS (FIG. 19) opens, wire wrapping for instance having been concluded, and hence the relay 1CR is deenergized, the contact 1CR-B is opened to deenergize the solenoid A, and air pressure supplied to the piston 46 is effective to cause the spindle 60 to be depressed and thus release the component body B prior to return ascent of the head 34 to its starting position.

FIG. 21 shows the module inverted, the leads of two transistors mounted by the machine having, in this instance, been wire-wrapped upon their appropriate terminals by means not shown herein. It will be apparent from the foregoing description that, despite the difficulty inherent in handling long leads, the present invention insures their being dealt with delicately, yet guided precisely and uniformly as required.

Having thus described our invention, what we claim as new and desire to secure by Letters Patent of the United States is:

1. A machine for mounting components by insertion of their flexible leads into holes of a socket, comprising means for releasably gripping one of the component bodies and movable toward and from the socket to carry the leads in general alinement with their lead-receiving holes, and lead positioning means initially movable laterally of the leads of a component held by said component gripping means to aline intermediate portions of the leads with their respective holes and then movable lengthwise along the leads and relatively away from the body gripping means and toward the socket to insure threading of the exposed lead ends into their respectively socket receiving holes during inserting movement of said gripping means toward the socket.

2. In a machine for mounting components having leads extending generally in one direction from their respective bodies, means for supporting a socket in selected lead-receiving position, an inserting head movable toward and from a socket adapted to receive the leads and positioned by the supporting means, said head having jaws for releasably gripping a component body and being mounted to carry its leads endwise toward the socket, lead positioning means including a lead engageable guide movably mounted on the head, and mechanism for controlling movement of the guide first laterally of the carried leads to aline intermediate portions thereof with the socket and then lengthwise of the leads and away from the body gripping jaws to prepare and aline the free ends of the leads for threading into the socket, said mechanism thereupon being operative during a portion of the lead inserting movement of the head to retract the guide from the socket and along the leads to a lead supporting and guiding position between the jaws and the socket.

3. A machine as set forth in claim 2 wherein the lead positioning means includes a pair of cooperative lead engaging guides formed to define the spacing of the leads according to the requirements of the socket, and means is provided for equalizing lateral movements of the guides in time relation to inserting movement of the jaws.

4. A machine as set forth in claim 2 characterized by the provision of means operable, upon receipt of a component body in said jaws in a fixed loading position, to rotate the head about an axis passing through the body predeterminedly to aline it angularly with the socket prior to operation of said lead positioning means.

5. A machine as set forth in claim 2 characterized in that said lead positioning means comprises a pair of cooperative lead guides, one of the guides having a pair of V-shaped lead-receiving grooves and an intermediate flat, and the other guide being formed with a pair of flats and an intermediate V-groove for slidably and predeterminedly confining adjacent portions of each of the leads with three angularly disposed guide surfaces.

6. In a machine for threading the leads of electrical components into sockets, table means for supporting a socket in selected lead-receiving position, an inserting head movable vertically in alinement to and from said position, a frame including ways for guiding the movement of said head, lateral lead positioning means including a yoke carried on said ways for effecting heightwise lead-engaging movements between the inserting head and said table means, mechanism for controlling relative heightwise movement of the head and said lead positioning means whereby the latter slides along the leads of the component to be mounted, first away from the head and substantially to the socket and then retracts part way along the leads to support them for insertion, and means mounted on said yoke and operable in time relation to said mechanism for controlling lateral movements of the lead positioning means into and out of lead engaging positions in register with said socket.

7. A machine as set forth in claim 6 and further characterized by the provision of manually controlled means for operating the inserting head, and safety mechanism for rendering the last mentioned means inoperative when said table means does not support a socket in position alined with the head to receive the component leads.

References Cited in the file of this patent

UNITED STATES PATENTS 2,163,716    Turner _____ June 27, 1939